H. HOOVER.
Reaper Attachment.
No. 217,219.   Patented July 8, 1879.
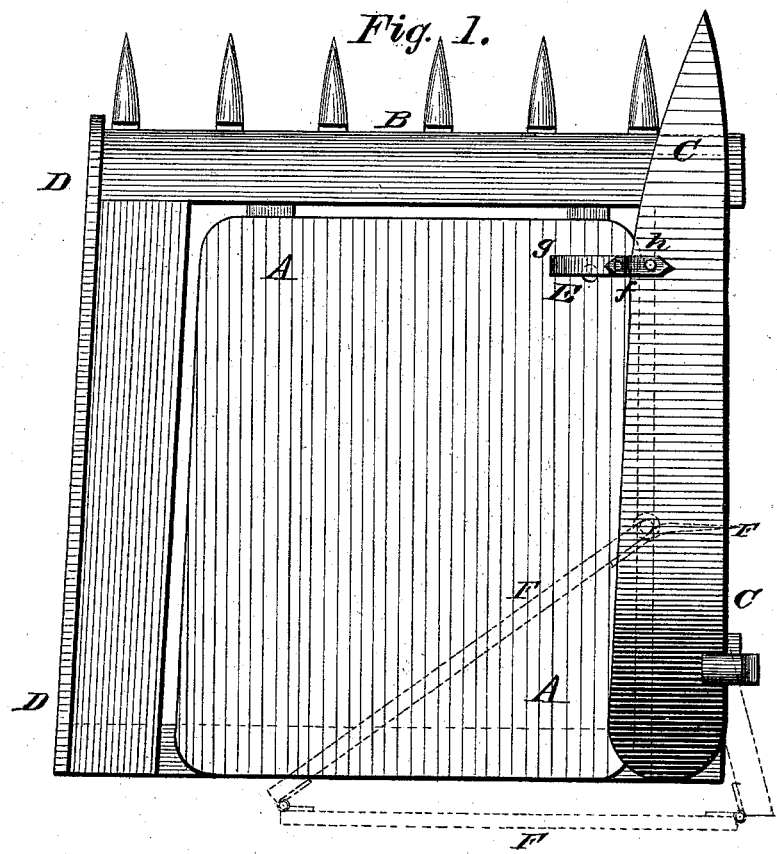
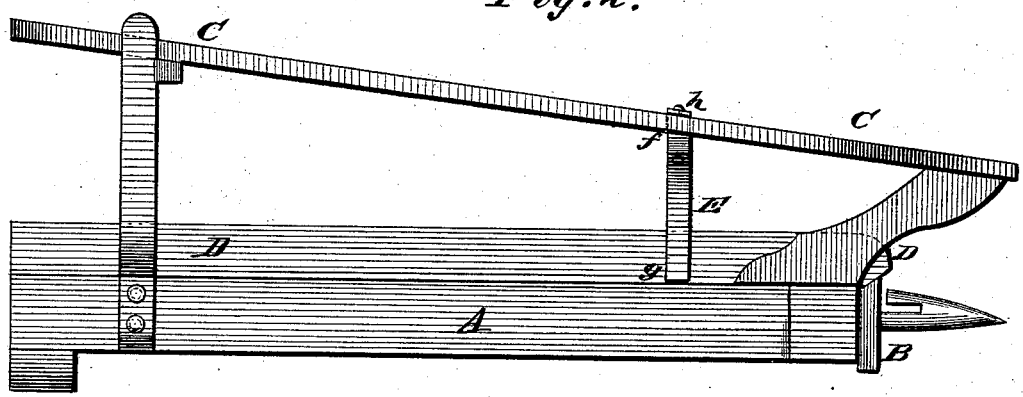

UNITED STATES PATENT OFFICE.

HENRY HOOVER, OF MORRISON, ILLINOIS.

IMPROVEMENT IN REAPER ATTACHMENTS.

Specification forming part of Letters Patent No. 217,219, dated July 8, 1879; application filed May 8, 1879.

*To all whom it may concern:*

Be it known that I, HENRY HOOVER, of the city of Morrison, in the county of Whiteside and State of Illinois, have invented certain new and useful Improvements in Reaper Attachments; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an attachment to a self-raking reaper, such as shown in Letters Patent of the United States No. 33,761, issued to W. A. Wood November 19, 1861, and pertains specially to a device to prevent the cut grain from gathering on and about the rake-head. Only those portions of such reapers will be shown which are necessary to illustrate the mode of attachment and operation of my invention.

Figure 1 is a plan view of the grain-platform of such reaper, showing my attachment hinged to the divider, and its lower end resting on the platform near its corner. Fig. 2 is an enlarged side elevation of the divider with attachment fastened thereto.

A is the grain-platform, located directly behind the sickle-bar B. C is the divider, which extends forward of the sickle-bar B, and is located on that side of the reaper next to the uncut grain. The function of the divider C is to separate the grain to be cut by the reaper at each passage from the grain left standing.

Around the platform proper, in the groove shown, an endless chain or belt traverses, moved by suitable gearing connected with the carrying-wheels. (Not shown.) On the top of this chain is fastened a horizontal rake, F, having its teeth horizontal, and pointing obliquely toward the inside of the machine.

As the machine moves forward, the grain cut by the sickle falls over the sickle-bar B, resting on the latter and the front of the platform. As the rake carried by the endless chain mentioned passes around the platform it engages the cut grain at the front outside corner of the platform, and passing along the front of the platform parallel therewith bunches the grain against the grain-board D, and passing down the groove on the inside of the platform carries with it the gavel, and discharges it in condition for binding at the rear of the platform.

In the reapers of the kind mentioned as heretofore used there has been a defect, which was in substance this: When the grain falls back over the sickle-bar B, some of it would be so near the divider C as that, when the rake would make its transit past that point, part of the cut grain would be behind the rake, and, by reason of its entanglement with the other cut grain in front of the rake, would be dragged after the rake, and when the gavel was discharged this grain, clinging more or less to the rake, would draw after it part of the gavel, and would be itself, in part, dragged off between the gavels, thus scattering or draggling, and not only increasing the labor of gathering the grain for binding, but resulting in considerable loss.

Again, at the inside of the divider, where the rake would first engage the cut grain, as some of the latter lay flat on the platform, the rake would be forced over a few of the straws, which latter would double around the bolt by which the rake-head is fastened to the endless belt, and if the grain was a little damp such straws would accumulate under the rake-head until it would be necessary to either take off the rake-head to remove them or cut out the straw with a knife, the accumulating straw having in the meanwhile greatly disarranged the gavels by dragging their tops awry. To obviate these difficulties, I provide the hinged guide E, having the hinge $h$, and hinge the same at its upper end to the inside of the divider C at the point $f$, and allow the lower end of such guide to rest on the platform A at the point $g$. On the full-sized machine the lower end of the guide E rests on the platform about an inch inside of the oil-hole at that point, so that the guide E stands slightly in at the lower end.

The operation is as follows: As the cut grain next the divider falls back over the sickle-bar B it is carried slightly inward by the guide E, and at the same time held from falling flat on the platform. When the rake-head comes up the outside interval, and before it makes the turn to pass parallel with the sickle-bar B, it comes up behind the guide E, and, of course, behind or outside of and below the cut grain. As the rake passes along the sickle-bar B it raises the lower end of guide E and passes under it, which, as soon as the rake-head passes it, falls back to its original position, and the process is repeated. As the rake-head starts in behind all of the cut grain, the latter is all before the rake at the point of discharge, and is thrown off in a compact and orderly gavel. The fact that part of the cut grain may lie flat on the platform farther in from the outer end works no inconvenience, for the reason that the uncut grain first engaged and next the rake-head sweeps the residue before it. It is essential to the satisfactory working of the guide E that its inner surface be on a line with the inner edge of the divider C, and that the hinge h, whether of leather or metal, be attached over the top of the divider, and on the inner face of the guide, so as to present no angles or recesses to interrupt the passage of the straw. The guide E will require to be about fourteen inches long.

The simple appearance of my invention might seem to argue against it; but it practically increases largely the efficiency of such reaper in the matter referred to, and that it does so I have verified by actual experience.

What I claim as my invention, and desire to secure by Letters Patent, is—

As an attachment to the kind of self-raking reaper mentioned, the guide E, having the hinge h, and arranged and operating substantially as and for the purpose described.

In testimony that I claim the foregoing I have hereunto set my hand this 1st day of May, 1879.

HENRY HOOVER.

Witnesses:
R. L. WILSON,
H. C. WARD.